United States Patent
Guida et al.

(10) Patent No.: US 7,147,208 B1
(45) Date of Patent: Dec. 12, 2006

(54) HIGH-SPEED HIGH-FLOW HIGH FREQUENCY VALVE

(75) Inventors: Renato Guida, Wynantskill, NY (US); Stanton Weaver, Northville, NY (US)

(73) Assignee: Lockheed Martin Corporation, Bethesda, MD (US)

( * ) Notice: Subject to any disclaimer, the term of this patent is extended or adjusted under 35 U.S.C. 154(b) by 48 days.

(21) Appl. No.: 11/090,683

(22) Filed: Mar. 25, 2005

(51) Int. Cl.
*F16K 31/12* (2006.01)
(52) U.S. Cl. ...................................... 251/331
(58) Field of Classification Search ................. 251/331
See application file for complete search history.

(56) References Cited

U.S. PATENT DOCUMENTS

| 6,774,539 B1 | 8/2004 | Guida |
| 6,830,229 B1 | 12/2004 | Wetzel et al. |

*Primary Examiner*—J. Csaimer Jacyna
(74) *Attorney, Agent, or Firm*—Jeffrey D. Myers; Timothy D. Stanley; Peacock Myers, P.C.

(57) ABSTRACT

A valve and concomitant method of controlling flow of a fluid with a valve comprising isolating a fluid path from a valve stem with a diaphragm in a valve body, blocking the fluid path with a plunger having a stroke of less than approximately 500 micrometers, driving the plunger with an actuator, and operating the valve at a frequency of at least approximately 20 Hz but with a flow of at least approximately 5.0E-04 kg/sec.

20 Claims, 3 Drawing Sheets

HIGH-SPEED HIGH-FLOW HIGH FREQUENCY VALVE

CROSS-REFERENCE TO RELATED APPLICATIONS

Not Applicable.

STATEMENT REGARDING FEDERALLY SPONSORED RESEARCH OR DEVELOPMENT

Not Applicable.

INCORPORATION BY REFERENCE OF MATERIAL SUBMITTED ON A COMPACT DISC

Not Applicable.

COPYRIGHTED MATERIAL

Not Applicable.

BACKGROUND OF THE INVENTION

1. Field of the Invention (Technical Field)

The present invention relates to a single stage micro- or mini-sized valve comprising a direct drive actuator, capable of rapid opening/closing transient time, and capable of working at high frequency.

2. Description of Related Art

For some applications, a rapid high-flow valve is necessary, such as for steering space vehicles and controlling equipment that requires a fast response. Conventional fluid valves are usually either fast but low-flow or slow and high-flow. One possibility is to use multistage valves with at least two stages. Unfortunately this class of valves solves the frequency problem by operating on the slave valve (pilot stage) at reduced flow and therefore higher frequency. Under these conditions the opening and closing transient time suffers an intrinsic delay that even in the case of two stages can severely limit the final obtainable frequency, as in U.S. Pat. No. 6,830,229, to Wetzel, et al.

The present invention achieves maximum operating speed and maximum frequency by using a single stage valve controlled by a fast direct-coupled actuator. An appropriate such actuator is disclosed in U.S. Pat. No. 6,774,539, to Guida.

BRIEF SUMMARY OF THE INVENTION

The present invention is of a valve and concomitant method of controlling flow of a fluid with a valve, comprising: isolating a fluid path from a valve stem with a diaphragm in a valve body; blocking the fluid path with a plunger having a stroke of less than approximately 500 micrometers; driving the plunger with an actuator; and operating the valve at a frequency of at least approximately 20 Hz but with a flow of at least approximately 5.0E-04 kg/sec. In the preferred embodiment, the valve provides a flow of at least approximately 1.0E-03 kg/sec. A dome shaped recess within the body accommodates the diaphragm, is conformal to the shape of the diaphragm when in an open state, and has a depth of approximately 50% of total diaphragm swing. A stem conditioner may be employed to limit down stroke of the plunger, and may be a spring, one or more valves controlling recovery time, and/or a stem with an upper and lower portion capable of telescoping operation (most preferably including a smaller valve operating only in one direction and a larger valve operating only in the other direction).

Objects, advantages and novel features, and further scope of applicability of the present invention will be set forth in part in the detailed description to follow, taken in conjunction with the accompanying drawings, and in part will become apparent to those skilled in the art upon examination of the following, or may be learned by practice of the invention. The objects and advantages of the invention may be realized and attained by means of the instrumentalities and combinations particularly pointed out in the appended claims.

BRIEF DESCRIPTION OF THE SEVERAL VIEWS OF THE DRAWINGS

The accompanying drawings, which are incorporated into and form a part of the specification, illustrate one or more embodiments of the present invention and, together with the description, serve to explain the principles of the invention. The drawings are only for the purpose of illustrating one or more preferred embodiments of the invention and are not to be construed as limiting the invention. In the drawings.

Figure 1:
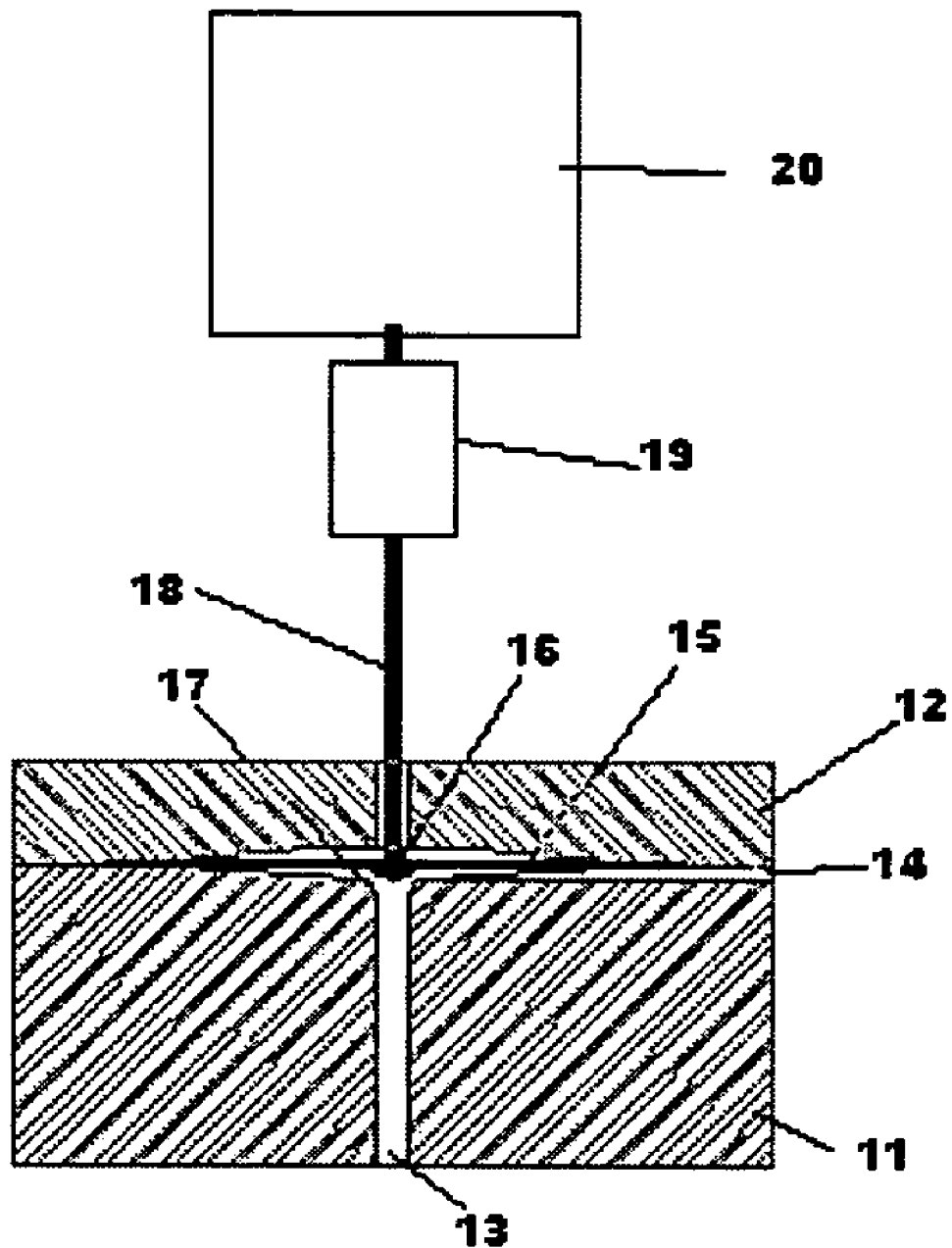
FIG. 1 is a cross-section view of the entire valve of the invention.

In the drawings, the following reference numerals are employed:

11 Bottom valve body
12 Top valve body
13 Valve inlet
14 Valve outlet
15 Isolation diaphragm
16 Plunger
17 Valve seat
18 Stem
19 Stem conditioner
20 Actuator
21 Bottom block
22 Valve seat
23 Inlet port
24 Outlet port
25 Bottom inlet chamber
31 Bottom valve block
32 Flat valve seat
33 Valve inlet.
34 Inlet chamber
35 Seat step
41 Top valve block
42 Upper inlet chamber
43 Diaphragm positioning and holding recess
44 Isolation diaphragm
45 Dome shaped diaphragm stop.
46 Valve Stem
47 Stem access hole 48 Plunger
51 Plunger
52 Valve main body
53 Down stroke travel stopper
54 Valve upper body
55 Stem
56 Diaphragm
61 Conical spring
62 Top valve body
63 Stem spring collar
64 Stem
65 Plunger
66 Diaphragm conformal stop
67 Inlet chamber
71 Spring
72 Stem
73 Plunger
81 Container
82 Fluid
83 Piston
84 Valve stem
85 Conical Spring
86 One-way fast port
87 One way slow port
88 Stem aligner and stopper
89 Stroke length adjust gap

DETAILED DESCRIPTION OF THE INVENTION

The present invention is of a valve comprising a minimum of basic parts, thereby rendering it simple, reliable, and robust. The valve and its preferred components are illustrated in FIG. 1. Main body 11 serves as support to hold all other parts. Top plate 12 operates as the valve cover. Diaphragm 15 isolates the fluid path from the valve stem. Plunger 16 physically blocks the flow in conjunction with valve seat 17, stem 18 operates the plunger 16, actuator 20 drives the stem 18 according to the valve specifications. Stem stroke conditioner 19 can be included to match the system requirements and/or improve performance.

Figure 2:
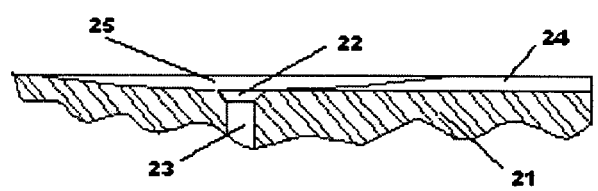
FIG. 2 is a more detailed view of the bottom valve body.

FIG. 2 is a cross-section of main body 11, with 21 being the bulk valve body made of metal, ceramic, or composed material depending on the operation and performance required. Built into the body 21 is an inlet hole 23 for the incoming fluid to be controlled, and an outlet channel 24 that serves as the fluid exit. Concentrically to inlet port 23 is plunger seat 22, and a chamber 25 machined in the body 21 for the double function of creating the fluid path once the valve is in open position, and permitting the motion of plunger 16 and diaphragm 15. The chamber should be as small as possible to avoid time delay during the valve opening, but large enough to ensure an unrestricted fluid flow path. The valve seat can be shaped as round, conical, or flat depending on the application. A round seat as illustrated in 22 has the advantage of self alignment and providing a high pressure contact point.

Figure 3:
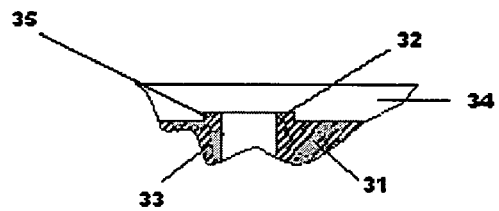
FIG. 3 is a bottom block top view.

FIG. 3 is a cross-section of a flat shaped valve seat, where 31 is the main valve body, 33 is the valve inlet, 34 the valve outlet, 35 is a step defining the contact surface between plunger and seat which in turn determines the closing pressure capability of the valve. (Pressure=Force/Area). 32 is the flat sealing area of the valve seat. The valve seat can be machined, cast in bulk, or added as an insert, in which case it is interchangeable.

Figure 4:
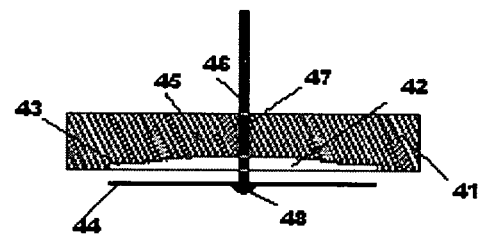
FIG. 4 is a top block cross-section view.

The valve top body illustrated in FIG. 4 comprises a bulk plate 41 in which there is a trough hole 47 for stem 46 to reach plunger 48. A dome shaped recess 45 accommodates diaphragm 44 during the opening cycle. The shape of dome 45 is designed to reduce excessive stress in the diaphragm by acting as a uniform stop. To do so it must be conformal to the diaphragm shape in the open condition. To reduce the diaphragm stress, the depth of dome 45 should be about 50% of the total diaphragm swing. A shallow step 43 can be machined to recess dome 45 for the purpose of self-aligning and position-retaining diaphragm 44.

Figure 5:
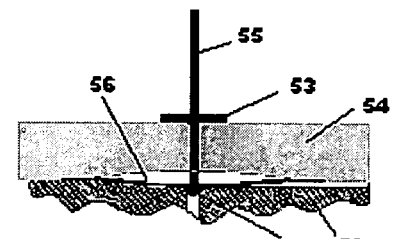
FIG. 5 is a cross-section view of the stroke length conditioner.

FIG. 5 shows one application of stem conditioner 19. In this instance, stem 55 is provided with a hard stop 53 that limits the down stroke of plunger 55 by reaching top valve body 54. This may be required to avoid damage to plunger 51 and seat 32, or in the case of flat seat 32 without plunger, damage to diaphragm 56.

Figure 6:
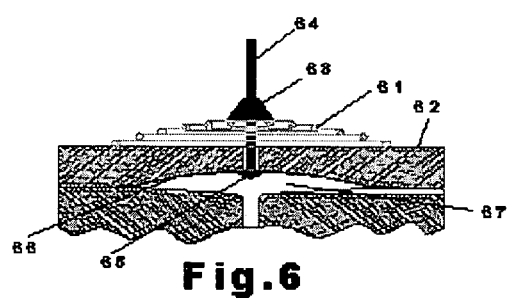
FIG. 6 is a cross-section view of the stroke speed conditioner.

FIG. 6 is another application of stem conditioner 19. In this instance a spring 61 is placed between stop 63 and top valve body 62, which has the effect of speeding up the opening of the valve in case of an unbalanced actuator action, or if so needed in special operations. Spring 61 can be cylindrical or, to reduce space, conical as in 61. Obviously, this spring if positioned on the other end of the stem produces the opposite action (i.e., speeding up of the closing cycle).

Figure 7:
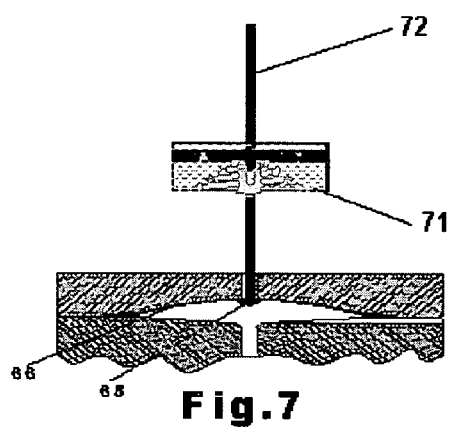
FIG. 7 is an alternative embodiment of the conditioner.

Another important use of conditioner 19 is considered in FIG. 7. In this instance spring 71 is located along stem 72, with or without any stop, and provides a damping action by absorbing any excess down stroke otherwise applied directly to plunger 73.

Figure 8:
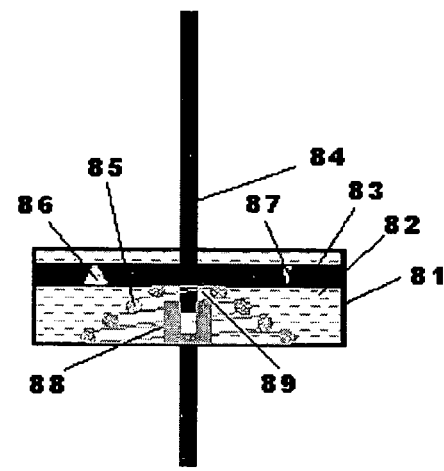
FIG. 8 is a cross-section view of the self-adjusting stem length device.

FIG. 8 shows a self-adjusting stroke amplitude application of a conditioning device 19. In this instance spring 85 is placed inside a closed container 81, which acts like a hydraulic damper of the same kind used with cars or door closing. Valve 87, which controls the recovery time, is preferably sized in such a way as to recover only a small fraction of the stem length at a given frequency. The length of the stem is practically self adjusted during the first downward valve cycle because the extra length is reduced by means of upper stem portion 89 moving inside bottom stem portion 88. This is a fast adjustment due to large one-way valve 86. Successively during the up worth steam motion the spring 85 tries to expand back, but the amount of expansion is limited by small valve 87 preventing fluid 82 from returning to the upper part of the container 81.

The overall operation of the valve of the invention is straightforward: actuator 20 keeps the valve closed by pushing on plunger 16 via stem 18 with or without the help of conditioner 19. When actuator 20 retracts, the pressure of the fluid coming in through inlet 13 pushes upward first plunger 16 and then diaphragm 15, permitting fluid flow through chamber 67 and out to valve outlet 14. The stem conditioner is not necessary for the valves functioning, but may be employed to accommodate special valve applications. Plunger 16 can be conical, spherical or flat, in which case it can entirely be replaced by diaphragm 15 assuming that it can stand the compression stress imposed by stem 18.

The present invention provides flow up to more then ten times greater than prior art valves operating at high frequency, i.e., >20 Hz. This provides the ability to closely match load requirements (maximum efficiency) if used in conjunction with a high pressure high speed actuator as discussed above Table 1 provides a comparison between a prior art fast valve (as disclosed in U.S. Pat. No. 6,830,229) and the valve of the present invention:

TABLE 1

|  | Prior Art Valve | Valve of the Present Invention | | Units |
| --- | --- | --- | --- | --- |
|  |  | High Pres. | Long Stroke |  |
| Actuator Force | 5 | 2000 | 10 | N |
| Pressure | 1500 | 1309878 | 2911 | K(Pa) |
| Stroke | 40 | 40 | 377 | μm |
| Orifice Diameter | 2 | 2 | 3 | mm |
| Orifice Area | 3.14 | 3.14 | 7.07 | mm$^2$ |
| Flow area | 0.251 | 0.251 | 3.553 | mm$^2$ |
| Flow | 1.0E−04 | >10X | >10X | kg/sec |

Note: Frequency and flow are directly dependent. Moreover, the flow is a function of fluid density, fluid viscosity, and pressure, and therefore if the working conditions are not known it is difficult to specify exact valve performance. Only the ranges can be calculated.

In summary, the present invention provides the advantages of simple construction, small number of parts, relatively low fabrication cost, very high performance as to speed, pressure, temperature, and full flow path isolation, and the ability to customize performance.

Although the invention has been described in detail with particular reference to these preferred embodiments, other embodiments can achieve the same results. Variations and modifications of the present invention will be obvious to those skilled in the art and it is intended to cover in the appended claims all such modifications and equivalents. The entire disclosures of all references, applications, patents, and publications cited above are hereby incorporated by reference.

What is claimed is:

1. A valve comprising:
   a body;
   a diaphragm within said body isolating a fluid path from a valve stem;
   a plunger capable of blocking the fluid path and having a stroke of less than approximately 500 micrometers; and
   an actuator driving said plunger; and
   wherein said valve operates at a frequency of at least approximately 20 Hz but provides a flow of at least approximately 5.0E-04 kg/sec.

2. The valve of claim 1 wherein said valve provides a flow of at least approximately 1.0E-03 kg/sec.

3. The valve of claim 1 additionally comprising a dome shaped recess within said body accommodating said diaphragm.

4. The valve of claim 3 wherein said recess is conformal to the shape of said diaphragm when in an open state.

5. The valve of claim 3 wherein said recess has a depth of approximately 50% of total diaphragm swing.

6. The valve of claim 1 additionally comprising a stem conditioner limiting down stroke of said plunger.

7. The valve of claim 6 wherein said stem conditioner comprises a spring.

8. The valve of claim 6 wherein said stem conditioner comprises one or more valves controlling recovery time.

9. The valve of claim 6 wherein said stem conditioner comprises a stem with an upper and lower portion capable of telescoping operation.

10. The valve of claim 9 wherein said stem conditioner comprises a smaller valve operating only in one direction and a larger valve operating only in the other direction.

11. A method of controlling flow of a fluid with a valve, the method comprising the steps of:
    isolating a fluid path from a valve stem with a diaphragm in a valve body;
    blocking the fluid path with a plunger having a stroke of less than approximately 500 micrometers;
    driving the plunger with an actuator; and
    operating the valve at a frequency of at least approximately 20 Hz but with a flow of at least approximately 5.0E-04 kg/sec.

12. The method of claim 11 wherein in the operating step the valve provides a flow of at least approximately 1.0E-03 kg/sec.

13. The method of claim 11 additionally comprising the step of providing a dome shaped recess within the body accommodating the diaphragm.

14. The method of claim 13 wherein the recess is conformal to the shape of the diaphragm when in an open state.

15. The method of claim 13 wherein the recess has a depth of approximately 50% of total diaphragm swing.

16. The method of claim 11 additionally comprising the step of employing a stem conditioner limiting down stroke of the plunger.

17. The method of claim 16 wherein the stem conditioner comprises a spring.

18. The method of claim 16 wherein the stem conditioner comprises one or more valves controlling recovery time.

19. The method of claim 16 wherein the stem conditioner comprises a stem with an upper and lower portion capable of telescoping operation.

20. The method of claim 19 wherein the stem conditioner comprises a smaller valve operating only in one direction and a larger valve operating only in the other direction.

* * * * *